United States Patent [19]

Coleman

[11] 3,933,761

[45] Jan. 20, 1976

[54] NITROGEN-CONTAINING ESTER AND LUBRICANT CONTAINING THE SAME

[75] Inventor: Lester Earl Coleman, Willoughby Hills, Ohio

[73] Assignee: The Lubrizol Corporation, Cleveland, Ohio

[22] Filed: Aug. 10, 1972

[21] Appl. No.: 279,421

Related U.S. Application Data

[60] Continuation-in-part of Ser. No. 125,380, March 17, 1971, abandoned, and a continuation-in-part of Ser. No. 125,401, March 17, 1971, Pat. No. 3,702,300, said Ser. No. 125,380, is a division of Ser. No. 867,915, Oct. 20, 1969, abandoned, said Ser. No. 125,401, is a continuation-in-part of Ser. No. 867,915, Oct. 20, 1969, abandoned, said Ser. No. 867,915, is a continuation-in-part of Ser. No. 785,735, Dec. 20, 1968, abandoned.

[52] U.S. Cl. ...... 260/78.5 T; 252/51.5 A; 252/56 D; 260/78.5 HC
[51] Int. Cl.² ...................... C08F 8/14; C08F 8/32; C08F 222/22
[58] Field of Search ............... 260/78.5 T, 78.5 HC; 252/51.5 A, 56 D

[56] References Cited

UNITED STATES PATENTS

| 2,615,845 | 10/1952 | Lippincott et al. | 252/56 |
|---|---|---|---|
| 2,912,416 | 11/1959 | Newey | 260/80.5 |
| 3,010,906 | 11/1961 | Signouret et al. | 252/56 |
| 3,235,503 | 2/1966 | deVries | 252/51.5 |
| 3,329,658 | 7/1967 | Fields | 260/78.5 |
| 3,432,479 | 3/1969 | Verdol et al. | 260/78.5 |
| 3,471,458 | 10/1969 | Mehmedbasich | 260/78.5 |
| 3,637,610 | 1/1972 | Jacobson | 260/78.5 T |

*Primary Examiner*—John Kight, III
*Attorney, Agent, or Firm*—James W. Adams, Jr.

[57] ABSTRACT

A carboxy-containing interpolymer in which some of the carboxy radicals are esterified and the remaining carboxy radicals are neutralized by reaction with a polyamino compound having one primary or secondary amino group is useful as an additive in lubricating compositions and fuels. The interpolymer is especially effective to impart desirable viscosity characteristics and anti-sludge properties to a lubricating oil.

15 Claims, No Drawings

NITROGEN-CONTAINING ESTER AND LUBRICANT CONTAINING THE SAME

This application is a continuation-in-part of copending applications Serial No. 125,380 and 125,401, both filed March 17, 1971 which, in turn are a division and a continuation of Serial No. 867,915 filed October 20, 1969, now abandoned. The latter is a continuation-in-part of application Serial No. 785,735, filed December 20, 1968, now abandoned Application Ser. No. 125,380 is now abandoned and Ser. No. 125,401 issued as U.S. Pat. No. 3,702,300 on Nov. 7, 1972.

The invention relates to a nitrogen-containing mixed ester of a carboxy-containing interpolymer and to lubricating compositions and fuel compositions containing such interpolymer.

It is well known that lubricating compositions and fuel compositions preferably should have desirable viscosity properties and anti-sludge properties and that such properties can be imparted by incorporating in such compositions chemical additives such as polymeric substances and detergents having the requisite solubility therein. Although many substances have been found effective for these purposes, concerted efforts are constantly being made to find new additives which are more economical and are more effective than additives heretofore known in the art. In particular, a great deal of interest exists in multifunctional additives, i.e., additives which are capable of imparting more than one desirable property to lubricating compositions and fuel compositions.

One of the problems associated with a multifunctioning additive is the difficulty in achieving a proper balance of its various characteristics, so that each desirable property can fully manifest itself under actual service conditions and yet compliment other desirable properties. For example, it is well recognized that for a polymeric substance to function as a viscosity index improving additive, it must have a sufficient but only limited solubility in a lubricating oil at ordinary temperatures. That is, it must be sufficiently soluble so that it can be incorporated in the oil at the desired concentration and yet it must have only a limited solubility so as not to exert its full viscosity-modifying properties until the temperature is increased under service conditions. In the latter regard, the additive becomes solubilized to an increased extent as temperature increases, so that it exerts its thickening effect to an increased extent and thus prevents excessive thinning of the lubricating oil due to the temperature rise. The dual requirements of a limited solubility and a sufficient solubility are difficult conditions to meet.

The problem is further complicated, if a viscosity index improving additive is to have also other properties such as anti-wear and anti-sludge properties. One solution is to incorporate into the molecular structure of such additive certain polar groups which are capable of imparting detergent or dispersant properties. Yet the incorporation of such polar groups necessarily affects the balance of the limited but sufficient solubility characteristics.

It is thus an object of this invention to provide a novel polymeric composition.

Another object of this invention is to provide novel lubricating compositions and fuel compositions.

Another object of this invention is to provide a novel process for preparing nitrogen-containing esters of carboxy-containing interpolymers.

Another object of this invention is to provide novel nitrogen-containing esters of carboxy-containing interpolymers.

Another object of this invention is to provide viscosity index improving agents.

Another object of this invention is to provide anti-sludge agents.

These and other objects are attained in accordance with this invention by providing a nitrogen-containing mixed ester of a carboxy-containing interpolymer having a reduced specific viscosity of from about 0.05 to about 2, said ester being substantially free of titratable acidity and being characterized by the presence within its polymeric structure of at least one of each of three pendant polar groups: (A) a relatively high molecular weight carboxylic ester group having at least eight aliphatic carbon atoms in the ester radical, (B) a relatively low molecular weight carboxylic ester group having no more than seven aliphatic carbon atoms in the ester radical, and (C) a carbonyl-polyamino group derived from a polyamino compound having one primary or secondary amino group, wherein the molar ratio of (A):(B):(C) is (60–90):(10–30):(2–15).

An essential element of the present invention is that the ester is a mixed ester, i.e., one in which there is the combined presence of both a high molecular weight ester group and a low molecular weight ester group, particularly in the ratio as stated above. Such combined presence is critical to the viscosity properties of the mixed ester, both from the standpoint of its viscosity index improving characteristics and from the standpoint of its thickening effect upon lubricating compositions in which it is used as an additive.

In reference to the size of the ester groups, it is pointed out that an ester radical is represented by the formula

$$-C(O)(OR)$$

and that the number of carbon atoms in an ester radical is thus the combined total of the carbon atom of the carbonyl group and the carbon atoms of the ester group, i.e., the (OR) group.

Another essential element of the present invention is the presence of a polyamino group derived from a particular polyamino compound, i.e., one in which there is one primary or secondary amino group. Such polyamino group, when present in the mixed ester in the proportion as stated above, not only enhances the anti-sludge properties but also achieves the desired balance of the solubility characteristics in relation to the ester groups present therein.

Still another essential element of the present invention is the extent of esterification in relation to the extent of neutralization of the unesterified carboxy groups of the carboxy-containing interpolymer through the conversion thereof to carbonyl polyamino containing groups. For convenience, the relative proportions of the high molecular weight ester group to the low molecular weight ester group and to the carbonyl polyamino group are expressed in terms of molar ratios of (60–90):(10–30):(2–15), respectively. The preferred ratio is (70–80):(15–25):5. It should be noted that the linkage described as the carbonyl-polyamino group may be amide, imide, or amidine, and inasmuch as any such linkage is contemplated within the present invention, the term "carbonyl-polyamino" is thought to be a convenient, generic expression useful for the purpose of defining the inventive concept.

Still another important element of the present invention is the molecular weight of the carboxy-containing interpolymer. For convenience, the molecular weight is expressed in terms of the "reduced specific viscosity" of the interpolymer which is a widely recognized means of expressing the molecular size of a polymeric substance. As used herein, the reduced specific viscosity (abbreviated as RSV) is the value obtained in accordance with the formula $$RSV = \frac{\text{Relative Viscosity} - 1}{\text{Concentration}}$$

wherein the relative viscosity is determined by measuring, by means of a dilution viscometer, the viscosity of a solution of one gram of the interpolymer in 100 ml. of acetone and the viscosity of acetone at $30° \pm 0.02°C$. For purpose of computation by the above formula, the concentration is adjusted to 0.4 gram of the interpolymer per 100 ml. of acetone. A more detailed discussion of the reduced specific viscosity, also known as the specific viscosity, as well as its relationship to the average molecular weight of an interpolymer, appears in *Paul J. Flory, Principles of Polymer Chemistry* (1953 Edition) pages 308 et seq.

While interpolymers having a reduced specific viscosity of from about 0.05 to about 2 are contemplated in the present invention, the preferred interpolymers are those having a reduced specific viscosity of from about 0.3 to about 1. In most instances, interpolymers having a reduced specific viscosity of from about 0.5 to about 1 are particularly useful.

From the standpoint of utility, as well as for commercial and economical reasons, nitrogen-containing mixed esters in which the high molecular weight ester group has from eight to 24 aliphatic carbon atoms, the low molecular weight ester group has from three to five carbon atoms and the carbonyl polyamino group is derived from a primary-aminoalkyl-substituted tertiary amine, particularly heterocyclic amine are preferred. Specific examples of the high molecular weight carboxylic ester group, i.e., the (OR) group of the ester radical (i.e., —C(O)(OR)) include heptyloxy, isooctyloxy, decyloxy, dodecyloxy, tridecyloxy, pentadecyloxy, octadecyloxy, eicosyloxy, tricosyloxy, tetracosyloxy, heptacosyloxy, triacontyloxy, hentriacontyloxy, tetracontyloxy, etc. Specific examples of low molecular weight groups include methyloxy, ethyloxy, n-propyloxy, isopropyloxy, n-butyloxy, sec-butyloxy, iso-butyloxy, n-pentyloxy, neo-pentyloxy, n-hexyloxy, cyclohexyloxy, cyclopentyloxy, 2-methyl-butyl-1-oxy, 2,3-dimethyl-butyl-1-oxy, etc. In most instances, alkoxy groups of suitable size comprise the preferred high and low molecular weight ester groups. Polar substituents may be present in such ester groups. Examples of polar substituents are chloro, bromo, ether, nitro, etc.

Examples of the carbonyl-polyamino group include those derived from polyamino compounds having one primary or secondary amino group and at least one mono-functional amino group such as tertiary-amino or heterocyclic amino group. Such compounds may thus be tertiary-amino substituted primary or secondary amines or other substituted primary or secondary amines in which the substituent is derived from pyrroles, pyrrolidones, caprolactams, oxazolidones, oxazoles, thiazoles, pyrazoles, pyrazolines, imidazoles, imidazolines, thiazines, oxazines, diazines, thiazines, oxycarbamyl, thiocarbamyl, uracils, hydantoins, thiohydantoins, guanidines, ureas, sulfonamides, phosphoramides, phenolthiazines, amidines, etc. Examples of such polyamino compounds include dimethylaminoethylamine, dibutylamino-ethylamine, 3-dimethylamino-1-propylamine, 4-methylethylamino-1-butylamine, pyridyl-ethylamine, N-morpholino-ethylamine, tetrahydropyridyl-ethylamine, bis-(dimethylamino)propylamine, bis-(diethylamino)ethylamime, N,N-dimethyl-p-phenylene diamine, piperadyl-ethylamine, 1-aminoethyl pyrazole, 1-(methylamino)pyrazoline, 1-methyl-4-aminooctyl pyrazole, 1-aminobutyl imidazole, 4-aminoethyl thiazole, 2-aminoethyl triazine, dimethylcarbamyl propylamine, N-methyl-N-aminopropyl acetamide, N-aminoethyl succinimide, N-methylamino maleimide, N-aminobutyl-alpha-chlorosuccinimide, 3-aminoethyl uracil, 2-aminoethyl pyridine, ortho-aminoethyl-N,N-dimethylbenzenesulfamide, N-aminoethyl phenothiazine, N-aminoethylacetamidine, 1-aminophenyl-2-methyl-imidazoline, N-methyl-N-aminoethyl-S-ethyl-dithiocarbamate, etc. For the most part, the polyamino compound are those which contain only one primary-amino or secondary-amino group and, preferably at least one tertiary-amino group. The tertiary amino group is preferably a heterocyclic amino group. In some instances polyamino compounds may contain up to about six amino groups although, in most instances, they contain one primary-amino group and either one or two tertiary amino groups. The polyamino compounds may be aromatic or aliphatic amines and are preferably heterocyclic amines such as aminoalkyl-substituted morpholines, piperazines, pyridines, benzopyrroles, quinolines, pyrroles, etc. They are usually amines having from four to about 30 carbon atoms, preferably from four to about 12 carbon atoms. Polar substituents may likewise be present in the polyamines.

The carboxy-containing interpolymers include principally interpolymers of $\alpha,\beta$-unsaturated acids or anhydrides such as maleic anhydride or itaconic anhydride with olefins (aromatic or aliphatic) such as ethylene, propylene, styrene, or isobutene. The styrene-maleic anhydride interpolymers are especially useful. They are obtained by polymerizing equal molar amounts of styrene and maleic anhydride, with or without one or more additional interpolymerizable comonomers. In lieu of styrene, an aliphatic olefin may be used, such as ethylene, propylene, isobutene. In lieu of maleic anhydride, acrylic acid or methyacrylic acid or ester thereof may be used. Such interpolymers are known in the art and need not be described in detail here. Where an interpolymerizable comonomer is contemplated, it should be present in a relatively minor proportion, i.e., less than about 0.3 mole, usually less than about 0.15 mole, per mole of either the olefin (e.g., styrene) or the $\alpha,\beta$-unsaturated acid or anhydride (e.g., maleic anhydride). For purpose of illustration, the interpolymerizable comonomers include the vinyl monomers such as vinyl acetate, acrylonitrile, methylacrylate, methylmethacrylate, acrylic acid, vinyl methyl ether, vinyl ethyl ether, vinyl chloride, isobutene or the like.

The nitrogen-containing mixed esters of the invention are most conveniently prepared by first esterifying the carboxy-containing interpolymer with a relatively high molecular weight alcohol and a relatively low molecular weight alcohol to convert at least about 50% and no more than about 98% of the carboxy radicals of the interpolymer to ester radicals and then neutralizing the remaining carboxy radicals with a polyamino compound such as described above. To incorporate the appropriate amounts of the two alcohol groups into the interpolymer, the ratio of the high molecular weight alcohol to the low molecular weight alcohol used in the process should be within the range of from about 2:1 to about 9:1 on a molar basis. In most instances the ratio is from about 2.5:1 to about 5:1. More than one high molecular weight alcohol or low molecular weight alcohol may be used in the process; so also may be used commercial alcohol mixtures such as the so-called Oxo-alcohols which comprise, for example, mixture of alcohols having from eight to about 24 carbon atoms. A particularly useful class of alcohols are the commercial alcohols or alcohol mixtures comprising octyl alcohol, decyl alcohol, dodecyl alcohol, tetradecyl alcohol, pentadecyl alcohol, eicosyl alcohol, and octadecyl alcohol. Other alcohols useful in the process are illustrated by those which, upon esterification, yield the ester groups exemplified above.

The extent of esterification, as indicated previously, may range from about 50% to about 98% conversion of the carboxy radicals of the interpolymer to ester radicals. In a preferred embodiment, the degree of esterification ranges from about 75% to about 95%.

The esterification can be accomplished simply by heating the carboxy-containing interpolymer and the alcohol or alcohols under conditions typical for effecting esterification. Such conditions usually include, for example, a temperature of at least about 80°C., preferably from about 150°C. to about 350°C., provided that the temperature be below the decomposition point of the reaction mixture, and the removal of water of esterification as the reaction proceeds. Such conditions may optionally include the use of an excess of the alcohol reactant so as to facilitate esterification, the use of a solvent or diluent such as mineral oil, toluene, benzene, xylene or the like and an esterification catalyst such as toluene sulfonic acid, sulfuric acid, aluminum chloride, boron trifluoridetriethylamine, hydrochloric acid, ammonium sulfate, phosphoric acid, sodium methoxide or the like. These conditions and variations thereof are well known in the art.

A particularly desirable method of effecting esterification involves first reacting the carboxy-containing interpolymer with the relatively high molecular weight alcohol and then reacting the partially esterified interpolymer with the relatively low molecular weight alcohol. A variation of this technique involves initiating the esterification with the relatively high molecular weight alcohol and before such esterification is complete, the relatively low molecular weight alcohol is introduced into the reaction mass so as to achieve a mixed esterification. In either event it has been discovered that a two-step esterification process whereby the carboxy-containing interpolymer is first esterified with the relatively high molecular weight alcohol so as to convert from about 50% to about 75% of the carboxy radicals to ester radicals and then with the relatively low molecular weight alcohol to achieve the finally desired degree of esterification results in products which have unusually beneficial viscosity properties.

The esterified interpolymer is then treated with a polyamino compound in an amount so as to neutralize substantially all of the un-esterified carboxy radicals of the interpolymer. The neutralization is preferably carried out at a temperature of at least about 80°C., often from about 120°C. to about 300°C., provided that the temperature does not exceed the decomposition point of the reaction mass. In most instances the neutralization temperature is between about 150°C. and 250°C. A slight excess of the stoichiometric amount of the polyamino compound is often desirable, so as to insure substantial completion of neutralization, i.e., no more than about 2% of the carboxy radicals initially present in the interpolymer remained unneutralized.

The following examples are illustrative of the preparation of the nitrogen-containing mixed esters of the present invention.

EXAMPLE 1

A styrene-maleic interpolymer is obtained by preparing a solution of styrene (16.3 parts by weight) and maleic anhydride (12.9 parts) in a benzene-toluene solution (270 parts; weight ratio of benzene:toluene being 66.5:33.5) and contacting the solution at 86°C. in nitrogen atmosphere for 8 hours with a catalyst solution prepared by dissolving 70% benzoyl peroxide (0.42 part) in a similar benzene-toluene mixture (2.7 parts). The resulting product is a thick slurry of the interpolymer in the solvent mixture. To the slurry there is added mineral oil (141 parts) while the solvent mixture is being distilled off at 150°C. and then at 150°C/200 mm Hg. To 209 parts of the stripped mineral oil-interpolymer slurry (the interpolymer having a reduced specific viscosity of 0.72) there are added toluene (25.2 parts), n-butyl alcohol (4.8 parts), a commercial alcohol consisting essentially of primary alcohols having from 12 to 18 carbon atoms (56.6 parts) and a commercial alcohol consisting of primary alcohols having from eight to 10 carbon atoms (10 parts) and to the resulting mixture there is added 96% sulfuric acid (2.3 parts). The mixture is then heated at 150°–160°C. for 20 hours whereupon water is distilled off. An additional amount of sulfuric acid (0.18 part) together with an additional amount of n-butyl alcohol (3 parts) is added and the esterification is continued until 95% of the carboxy radicals of the polymer has been esterified. To the esterified interpolymer, there is then added aminopropyl morpholine (3.71 parts; 10% in excess of the stoichiometric amount required to neutralize the remaining free carboxy radicals) and the resulting mixture is heated to 150°–160°C/10 mm Hg. to distill off toluene and any other volatile components. The stripped product is mixed with an additional amount of mineral oil (12 parts) and filtered. The filtrate is a mineral oil solution of the nitrogen-containing mixed ester having a nitrogen content of 0.16–0.17%.

EXAMPLE 2

The procedure of Example 1 is followed except that the esterification is carried out in two steps, the first step being the esterification of the styrene-maleic interpolymer with the commercial alcohols having from eight to 18 carbon atoms and the second step being the further esterification of the interpolymer with n-butyl alcohol.

EXAMPLE 3

The procedure of Example 1 is followed except that the esterification is carried out by first esterifying the styrenemaleic interpolymer with the commercial alcohols having from eight to 18 carbon atoms until 70% of the carboxyl radicals of the interpolymer have been converted to ester radicals and thereupon continuing the esterification with any yet-unreacted commercial alcohols and n-butyl alcohol until 95% of the carboxyl radicals of the interpolymer have been converted to ester radicals.

EXAMPLE 4

The procedure of Example 1 is followed except that the interpolymer is prepared by polymerizing a solution consisting of styrene (416 parts), maleic anhydride (392 parts) in benzene (2153 parts) and toluene (5025 parts) in the presence of benzoyl peroxide (1.2 parts) at 65°–106°C. (The resulting interpolymer has a reduced specific viscosity of 0.45.)

EXAMPLE 5

The procedure of Example 1 is followed except that the styrene-maleic anhydride is obtained by polymerizing a mixture of styrene (416 parts), maleic anhydride (392 parts), benzene (6101 parts) and toluene (2310 parts) in the presence of benzoyl peroxide (1.2 parts) at 78°–92°C. (The resulting interpolymer has a reduced specific viscosity of 0.91).

EXAMPLE 6

The procedure of Example 1 is followed except that the styrene-maleic anhydride is prepared by the following procedure: Maleic anhydride (392 parts) is dissolved in benzene (6870 parts). To this mixture there is added styrene (416 parts) at 76°C whereupon benzoyl peroxide (1.2 parts) is added. The polymerization mixture is maintained at 80°–82°C for about 5 hours. (The resulting interpolymer has a reduced specific viscosity of 1.24.)

EXAMPLE 7

The procedure of Example 6 is followed except that acetone (1340 parts) is used in place of benzene as the polymerization solvent and that azobis-isobutyronitrile (0.3 part) is used in place of benzoyl peroxide as a polymerization catalyst.

EXAMPLE 8

The procedure of Example 1 is followed except that the styrene-maleic anhydride interpolymer is prepared as follows: To a solution of maleic anhydride (69 parts) in benzene (805 parts) at 50°C there is added styrene (73 parts). The resulting mixture is heated to 83°C whereupon benzoyl peroxide (0.19 part) is added and then maintained at 80°–85°C. (The resulting interpolymer has a reduced specific viscosity of 1.64.)

EXAMPLE 9

The procedure of Example 1 is followed except that toluene sulfonic acid (3.5 parts) is used in place of sulfuric acid as the esterification catalyst.

EXAMPLE 10

The procedure of Example 1 is followed except that phosphoric acid (2.5 parts) is used in place of sulfuric acid as the esterification catalyst.

EXAMPLE 11

The procedure of Example 1 is followed except that dodecyl alcohol (0.7 mole per carboxy equivalent of the styrene-maleic anhydride interpolymer) is used in place of the alcohol mixtures having eight to 18 carbon atoms and isobutyl alcohol (0.2 mole per carboxy equivalent of the interpolymer) is used in place of n-butyl alcohol.

EXAMPLE 12

The procedure of Example 1 is followed except that eicosyl alcohol (0.8 mole consumed per carboxy equivalent of interpolymer) is used in place of the commercial alcohols having from eight to 18 carbon atoms and n-pentyl alcohol (0.15 mole consumed per carboxy equivalent of the interpolymer) is used in place of the n-butyl alcohol.

EXAMPLE 13

The procedure of Example 1 is followed except that octyl alcohol (0.8 mole consumed per carboxy equivalent of the interpolymer) is used in place of the commercial alcohols having from eight to 18 carbon atoms, isopentyl alcohol (0.1 mole consumed per carboxy equivalent of the interpolymer) is used in place of the n-butyl alcohol, and N-aminoethyl and 1-methyl-4-aminoethyl piperazine (0.1 mole consumed per carboxy equivalent of the interpolymer) is used in place of aminopropyl morpholine.

EXAMPLE 14

The procedure of Example 1 is followed except that dimethylamino-ethylamine is substituted for the aminopropyl morpholine used on a molar basis.

EXAMPLE 15

The procedure of Example 1 is followed except that dibutylamino-propylamine is substituted for the aminopropyl morpholine on a molar basis.

EXAMPLE 16

An interpolymer (0.86 carboxyl equivalent) of styrene and maleic anhydride (prepared from an equal molar mixture of styrene and maleic anhydride and having a reduced specific viscosity of 0.67–0.68) is mixed with mineral oil to form a slurry, and then esterified with a commercial alcohol mixture (0.77 mole; comprising primary alcohols having from eight to 18 carbon atoms) at 150°–160°C. in the presence of a catalytic amount of sulfuric acid until about 70% of the carboxyl radicals are converted to ester radicals. The partially esterified interpolymer is then further esterified with n-butyl alcohol (0.31 mole) until 95% of the carboxyl radicals of the interpolymer are converted to the mixed ester radicals. The esterified interpolymer is then treated with aminopropyl morpholine (slight excess of the stoichiometric amount to neutralize the free carboxyl radicals of the interpolymer) at 150°–160°C. until the resulting product is substantially neutral (acid number of 1 to phenolphthalein indicator). The resulting product is mixed with mineral oil so as to form an oil solution containing 34% of the polymeric product.

EXAMPLE 17

The procedure of Example 1 is followed except that the aminopropyl morpholine used is replaced on a chemical equivalent basis with N-aminoethyl pyrrole.

EXAMPLE 18

The procedure of Example 1 is followed except that the aminopropyl morpholine used is replaced on a chemical equivalent basis with N-aminopropyl thiopyrrolidone.

EXAMPLE 19

The procedure of Example 1 is followed except that the aminopropyl morpholine used is replaced on a chemical equivalent basis with N-aminoethyl caprolactam.

EXAMPLE 20

The procedure of Example 1 is followed except that the aminopropyl morpholine used is replaced on a chemical equivalent basis with N-aminophenyl oxazolidone.

EXAMPLE 21

The procedure of Example 1 is followed except that the aminopropyl morpholine used is replaced on a chemical equivalent basis with 4-aminoethyl thiazole.

EXAMPLE 22

The procedure of Example 1 is followed except that the aminopropyl morpholine used is replaced on a chemical equivalent basis with 2-cyclohexyl triazine.

EXAMPLE 23

The procedure of Example 1 is followed except that the aminopropyl morpholine used is replaced on a chemical equivalent basis with 1-aminoethyl-2-heptadecylimidazoline.

EXAMPLE 24

The procedure of Example 1 is followed except that the aminopropyl morpholine used is replaced on a chemical equivalent basis with N-aminooctyl succinamide.

EXAMPLE 25

The procedure of Example 1 is followed except that the aminopropyl morpholine used is replaced on a chemical equivalent basis with 3-aminobutyl uracil.

EXAMPLE 26

The procedure of Example 1 is followed except that the aminopropyl morpholine used is replaced on a chemical equivalent basis with 4-aminobutyl pyridine.

EXAMPLE 27

The procedure of Example 1 is followed except that the aminopropyl morpholine used is replaced on a chemical equivalent basis with N-aminomethyl phenolthiazine.

The nitrogen-containing mixed esters of this invention can be effectively employed in a variety of lubricating compositions based on diverse oils of lubricating viscosity such as a natural or synthetic lubricating oil, or suitable mixtures thereof. The lubricating compositions contemplated include principally crankcase lubricating oils for spark-ignited and compressionignited internal combustion engines including automobile and truck engines, two-cycle engine lubricants, aviation piston engines, marine and railroad diesel engines, and the like. However, automatic transmission fluids, transaxle lubricants, gear lubricants, metal-working lubricants, hydraulic fluids, and other lubricating oil and grease compositions can benefit from the incorporation of the present additives.

Natural oils include animal oils and vegetable oils (e.g., castor oil, lard oil) as well as solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzene, dinonylbenzenes, di-(2-ethylhexyl)benzenes, etc.); polyphenyls (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1,000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ Oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, furmaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl-silicate, tetraisopropyl-silicate, tetra-(2-ethylhexyl)-silicate, tetra-(4-methyl-2-tetraethyl)-silicate, tetra-(p-tert-butylphenyl)-silicate, hexyl-(4-methyl-2-pentoxy)-disiloxane, poly(methyl)-siloxanes, poly-(methylphenyl)-siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahdyrofurans, and the like.

Of the various lubricants, crankcase lubricants and automobile transmission fluids are especially adapted to the improvement by the use of the additives of the present invention. In such uses, the concentration of the nitrogen-containing esters may be as low as 0.01%, although it more often is from 0.1% to 10% by weight of the finished lubricant. A higher concentration such as 15% or 20% may be employed.

As indicated previously, the nitrogen-containing esters are capable of imparting both anti-sludge properties and desirable viscosity properties to lubricants. In the former regard, the additives impart detergent or dispersant characteristics to the lubricant and thus help to keep the metal parts to be lubricated free from harmful deposits. In the latter regard, the additives increase the viscosity index of the lubricant and thus extend the versatility and lubricating qualities of the lubricant at both high and low service temperatures. such properties of the nitrogen-containing mixed esters of the present invention.

TABLE I

Viscosity Index Values

| Additive present in Test Lubricant (Mineral Lubricating Oil having a Viscosity of 200–210 SUS at 100°C) | Additive Concentration (% weight) | Viscosity Index* |
|---|---|---|
| (A) None | — | 95–98 |
| (B) The Ester of Example 1 | 1.75 | 137 |
| (C) Ester prepared by esterifying 92% of the carboxyl radicals of a styrene-maleic anhydride (1:1 molar) interpolymer (RSV of 1.05) with a combination of 90 weight parts of a commercial $C_{12-14}$ alcohol mixture and 10 weight parts of butyl carbitol, then neutralizing with aminopropyl morpholine. | 1.5 | 133 |
| (D) Ester prepared by esterifying 89.7% of the carboxyl radicals of the interpolymer of (C) above with a combination of 95 weight parts of a commercial $C_{12-14}$ alcohol mixture and 10 weight parts of butyl cellosolve and then neutralizing with aminopropyl morpholine. | 1.5 | 135 |

*As determined in accordance with ASTM Procedure D-567

TABLE II

Low Temperature Viscosity Values

| | Brookfield Viscosity (cps) -40°F |
|---|---|
| (A) Base Oil A | >100,000 |
| (B) Base Oil B | >100,000 |
| (C) Base Oil C | >100,000 |
| (D) Base Oil A + 1.15% by weight of the Ester of Example 16 (prepared by first esterifying the interpolymer with the $C_{8-18}$ commercial alcohols to 70% esterification and then further esterifying with mixed $C_{8-18}$ commercial alcohol and n-butyl alcohol to 95% esterification. | 28,000 |
| (E) Base Oil A + 1.15% by weight of an ester prepared essentially as in Example 16 except that the n-butyl alcohol is present with the $C_{8-18}$ commercial alcohols at the beginning of esterification | 30,200 |
| (F) Base Oil B + 1.15% by weight of the Ester of (D) above | 35,000 |
| (G) Base Oil B + 1.15% by weight of the Ester of (E) above | 46,600 |
| (H) Base Oil C + 1.15% by weight of the Ester of (D) above | 49,700 |
| (I) Base Oil C + 1.15% by weight of the Ester of (D) above | 70,900 |

The viscosity index properties are especially important to automatic transmission fluids, and so also are the thickening effects of viscosity index improving agents upon the lubricant base. One of the stringent requirements for automatic transmission fluids is the relatively narrow limits of viscosity values. For example, the so-called DEXRON specification for automatic transmission fluids has strict requirements in respect to low temperature viscosity characteristics and places a maximum viscosity of about 55,000 centipoises at −40°F. Such requirements can be met by viscosity index improving agents which, although effective to increase the viscosity index of the lubricant, must nevertheless not cause excessive thickening of the lubricant base. A particularly unusual characteristic of the nitrogen-containing mixed esters of the present invention is that they not only have desirable viscosity index improving properties but also cause no excessive thickening of the lubricant base at the desired concentrations, especially at low temperatures. Tables I and II below illustrate The anti-sludge properties of the esters of this invention are shown by the following test: A 350 cc lubricant sample consisting of a Mid-Continent, conventionally refined lubricating oil having a viscosity of about 200 SUS/100°F and containing 0.008% by weight of iron naphthenate as a promoter of oil degradation and 1.5% by weight of the additive to be tested is placed in a 2-inch × 15-inch borosilicate tube. A 1⅛ inch × 5⅞ inch SAE 1020 steel panel is immersed in the oil. The sample is then heated at 300°F for 96 hours while air is bubbled through the oil at a rate of 10 liters per hour. The oxidized sample is cooled, mixed with 0.5% by volume of water, homogenized, allowed to stand at room temperature for 24 hours and then filtered through 2 layers of filter paper. The precipitate is washed with naphtha and dried. The weight of the precipitate, adjusted to milligrams per 100 cc of oil tested, is taken as a measure of the effectiveness of the anti-sludge additive, i.e., the greater the weight of the precipitate the less effective the additive. The results of this test are shown in Table III.

TABLE III

| Additive Present in The Lubricant | Anti-Sludge Test Additive Concentration (% weight) | Sludge (mg/100 ml of Test oil) |
|---|---|---|
| None | — | 753–863 |
| The Ester of Example 16 | 1.5% | 12 |

Frequently lubricants containing the nitrogen-containing mixed esters of the present invention can be further improved by the incorporation therein of other additives such as supplemental detergents, corrosion inhibiting agents, oxidation inhibiting agents, anti-foam agents, friction-improving agents, anti-rust agents, etc. Examples of such additives are ash-containing detergents exemplified by neutral and basic salts of alkali or alkaline earth metals with sulfonic acids, carboxylic acids or organic phosphorus acids characterized by at least one direct carbon-to-phosphorus linkage such as those prepared by the reaction of an olefin polymer (e.g., polyisobutene having a molecular weight of 700–5000) with a phosphorus agent such as phosphorus pentasulfide, phosphorus trichloride, etc. The metal of such salts may be sodium, potassium, lithium, calcium, magnesium, strontium, barium or the like. The basic salts are preferably the carbonated metal complexes of the above-noted acids. They are exemplified by the carbonated alkaline earth metal complexes obtained by carbonating an acid or its neutral metal salt and an excess of a metal base such as barium oxide, lime, sodium hydroxide, potassium hydroxide, strontium hydroxide, magnesium, magnesium oxide, magnesium methoxide in the presence of a promoter such as phenol, alkylphenol, methanol, ethanol, or a higher alcohol or an amine. In lieu of an acid, an alkylphenol or a sulfurized alkylphenol can be converted to metal complexes by similar processes and such complexes are likewise contemplated for use in conjunction with the esters of the present invention.

Extreme pressure agents, corrosion inhibiting agents and oxidation inhibiting agents are illustrated by chlorinated hydrocarbons such as chlorinated wax; organic sulfides and polysulfides such as bis-(chlorobenzyl)disulfide, dibutyltetrasulfide, sulfurized sperm oil, sulfurized alkylphenol, phosphosulfurized terpene, dialkylphosphite, thiocarbamates, Group II metal phosphorodithioates, Group II metal salts of dialkarylphosphinodithioates.

Lubricating compositions containing esters of this invention may contain also ashless dispersants such as higher molecular weight hydrocarbon-substituted succinic derivatives of nitrogen compounds, particularly polyamines. A particularly effective class of ashless dispersants consists of the acylated nitrogen compounds disclosed in U.S. Pat. No. 3,272,746.

Automatic transmission fluids containing esters of the present invention often contain friction additives to improve the so-called slip-stick characteristics. Such additives are exemplified by fatty amines such as stearylamine and oleylamine, alkoxylated amines such as the reaction products of amines with ethyleneoxide or propyleneoxide and other derivatives of amines such as the reaction products of an alkoxylated amine with boric acid or boron oxide. Still other frictional additives are exemplified by sperm oil, sulfurized sperm oil, stearylamide methyloleate and other oily agents.

The above-illustrated additives may each be present in lubricating compositions at a concentration ranging from about 0.01% to about 20% by weight. In most instances, they each range from about 0.1% to about 10%. Some illustrative examples of lubricating compositions contemplated in the present invention are as follows (all percentages are by weight):

Example A: SAE 10W-30 mineral base oil containing 0.05% of the product of Example 1.

Example B: SAE 20 mineral lubricating oil containing 0.1% of the product of Example 16.

Example C: SAE 20W-30 mineral lubricating oil containing 2.5% of the product of Example 3 and 2% of calcium dicyclohexylphosphorodithioate.

Example D: ATF mineral base oil containing 4% of the product of Example 13, 0.2% of the reaction product of an ethoxylated dodecylamine and boron oxide, 0.8% of sulfurized sperm oil, and 0.95% of a carbonated basic metal complex prepared by carbonating a mixture of sperm oil and excess barium hydroxide in the presence of butylphenol as the promoter.

Example E: SAE 10W-30 mineral lubricating oil containing 6% of the product of Example 12, 0.1% of phosphorus as zinc dioctylphosphorodithioate, 5% of a basic barium sulfonate prepared by carbonating a mixture of barium mahogany sulfonate and excess barium oxide in the presence of water and octylphenol as the promoter.

Example F: ATF mineral base oil containing 2.5% of the product of Example 1, 2% of the reaction product of tetraethylene pentamine and polyisobutene(molecular weight of 1000)-substituted succinic anhydride, 2% of didecylphosphite and 3% of a basic metal complex prepared by carbonating polyisobutene(molecular weight of 300)-substituted salicylic acid and an excess of calcium hydroxide in the presence of methyl alcohol and acetic acid as the promoter.

What is claimed is:

1. An oil-soluble nitrogen-containing mixed ester of a carboxy-containing interpolymer having low-temperature viscosity improving properties and a reduced specific viscosity of from about 0.05 to about 2, said ester being substantially free of titratable acidity and being characterized by the presence within its polymeric structure of at least one of each of three pendant polar groups:
  A. a relatively high molecular weight carboxylic ester group having at least eight aliphatic carbon atoms in the ester radical,
  B. a relatively low molecular weight carboxylic ester group having no more than seven aliphatic carbon atoms in the ester radical, and
  C. a carbonyl-polyamino group derived from a polyamino compound having one primary or secondary amino group, wherein the molar ratio of (A):(B):(C) is (60–90):(10–30):(2–15).

2. The ester of claim 1 wherein the molar ratio of (A):(B):(C) is (70–80):(15–25):5.

3. The ester of claim 1 wherein the carboxy-containing interpolymer has a reduced specific viscosity of from about 0.3 to about 1.

4. The ester of claim 1 wherein the relatively high molecular weight carboxylic ester group of (A) has from eight to 24 aliphatic carbon atoms, the relatively low molecular weight carboxylic ester group of (B) has from three to five carbon atoms and the carbonyl-polyamino group of (C) is derived from a primary-aminoalkyl-substituted tertiary amine.

5. The ester of claim 1 wherein the carboxy-containing interpolymer is a terpolymer of one molar proportion of styrene, one molar proportion of maleic anhydride, and less than about 0.3 molar proportion of a vinyl monomer.

6. An oil-soluble nitrogen-containing mixed-ester of a carboxy-containing interpolymer wherein the carboxy-containing interpolymer has a reduced specific viscosity of from about 0.05 to about 2, the mixed ester has low-temperature viscosity improving properties, and is substantially free of titratable acidity; and the interpolymer is derived from at least two types of monomers, the one type being a low molecular weight aliphatic olefin or styrene, and the other type being an alpha, beta- unsaturated aliphatic acid, anhydride or ester thereof, said nitrogen-containing mixed ester being further characterized by having three types of pendant polar groups derived from the carboxy groups of the interpolymer; said pendant polar groups being
  A. a relatively high molecular weight carboxylic ester group having at least eight aliphatic carbon atoms in the ester radical,
  B. a relatively low molecular weight carboxylic ester group having no more than seven aliphatic carbon atoms in the ester radical, and
  C. a carbonyl-polyamino group derived from a poly-amino compound having one primary or secondary amino group;
wherein the molar of (A):(B):(C) is (60–90):(10–30):(2–15).

7. A nitrogen-containing mixed ester according to claim 6 of a carboxy-containing interpolymer having a reduced specific viscosity of from about 0.05 to about 2, said interpolymer being derived from at least 2 monomers, the one being ethylene, propylene, isobutene or styrene and the other being maleic acid or anhydride, itaconic acid or anhydride or acrylic acid or ester, said ester being substantially free of titratable acidity and being characterized by the presence within its polymeric structure of at least one of each of three pendant polar groups derived from the carboxy groups of said ester:
  A. A relatively high molecular weight carboxylic ester group having at least eight aliphatic carbon atoms in the ester radical,
  B. A relatively low molecular weight carboxylic ester group having no more than seven aliphatic carbon atoms in the ester radical,
  C. A carbonyl-polyamino group derived from a poly-amino compound having one primary or secondary amine group
wherein the molar ratio of (A):(B):(C) is (60–90):(10–30):(2–15).

8. A nitrogen-containing mixed ester according to claim 7 wherein the molar ratio of (A):(B):(C) is (70–80):(15–25):(5).

9. A nitrogen-containing mixed ester according to claim 7 wherein the interpolymer is a styrene-maleic anhydride interpolymer having a reduced specific viscosity of from about 0.3 to about 1.

10. A nitrogen-containing mixed ester according to claim 7 wherein the relatively high molecular weight carboxylic ester group of (A) has from eight to 24 aliphatic carbon atoms, the relatively low molecular weight carboxylic acid group of (B) has from three to five carbon atoms and the carbonyl-polyamino group of (C) is derived from a primary-aminoalkyl-substituted tertiary amine.

11. A nitrogen-containing mixed ester according to claim 7 wherein the carboxy-containing interpolymer is a terpolymer of one molar proportion of styrene, one molar proportion of maleic anhydride, and less than about 0.3 molar proportion of a vinyl monomer.

12. A nitrogen-containing mixed ester characterized by low-temperature viscosity improving properties prepared by the process comprising the steps:
  1. Partially esterifying a styrene-maleic anhydride interpolymer having a reduced specific viscosity of from about 0.05 to about 2 with a mixture of a relatively high molecular weight alcohol having at least seven aliphatic carbon atoms and a relatively low molecular weight alcohol having no more than six aliphatic carbon atoms so as to convert from about 50% to about 98% of the carboxy radicals of the interpolymer to ester radicals, the molar ratio of the relatively high molecular weight alcohol to the relatively low molecular weight alcohol being from about 2:1 to about 9:1, and
  2. Substantially neutralizing the remaining carboxy radicals of said interpolymers with a polyamino compound having one primary or secondary amino group.

13. A nitrogen-containing mixed ester according to claim 12 wherein the esterification of step (1) is carried out in a step-wise manner by esterifying the interpolymer first with the relatively high molecular weight alcohol and then with the relatively low molecular weight alcohol.

14. A nitrogen-containing mixed ester according to claim 12 wherein the esterification step of (1) is carried out by first esterifying the interpolymer with the relatively high molecular weight alcohol so as to convert at least about 70% of the carboxy radicals of the interpolymer to ester radicals and then with the relatively low molecular weight alcohol so as to convert at least about 90% of the carboxy radicals of the interpolymer to ester radicals.

15. A nitrogen-containing mixed ester according to claim 12 wherein said polyamino compound is N-aminoalkyl-substituted morpholine.

* * * * *

UNITED STATES PATENT OFFICE
CERTIFICATE OF CORRECTION

PATENT NO. : 3,933,761
DATED : January 20, 1976
INVENTOR(S) : Lester Earl Coleman It is certified that error appears in the above-identified patent and that said Letters Patent are hereby corrected as shown below:

At column 15, line 34, that is Claim 6, line 24, insert "ratio" after molar.

At column 16, line 12, that is Claim 10, line 5, -- acid -- should be "ester".

At column 16, line 57, that is Claim 15, line 2, -- 12 -- should be "14".

Signed and Sealed this eleventh Day of May 1976

[SEAL]

Attest:

RUTH C. MASON
Attesting Officer

C. MARSHALL DANN
Commissioner of Patents and Trademarks